June 4, 1957 D. F. SEYFERTH 2,794,656
ROCKING FIFTH WHEEL MEMBER FOR TRACTOR-SEMI-TRAILER VEHICLES
Filed Dec. 21, 1953 2 Sheets-Sheet 1
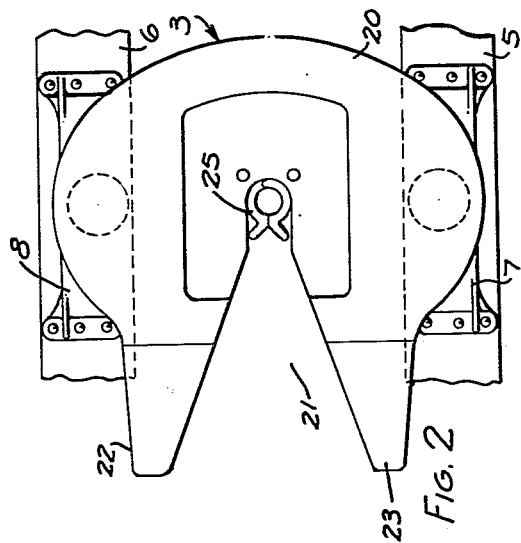
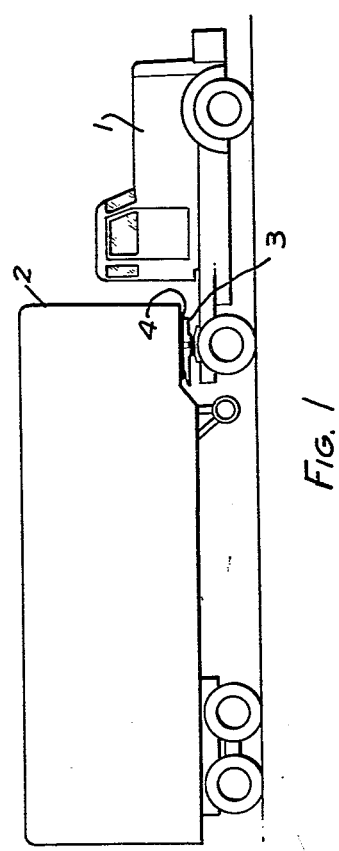
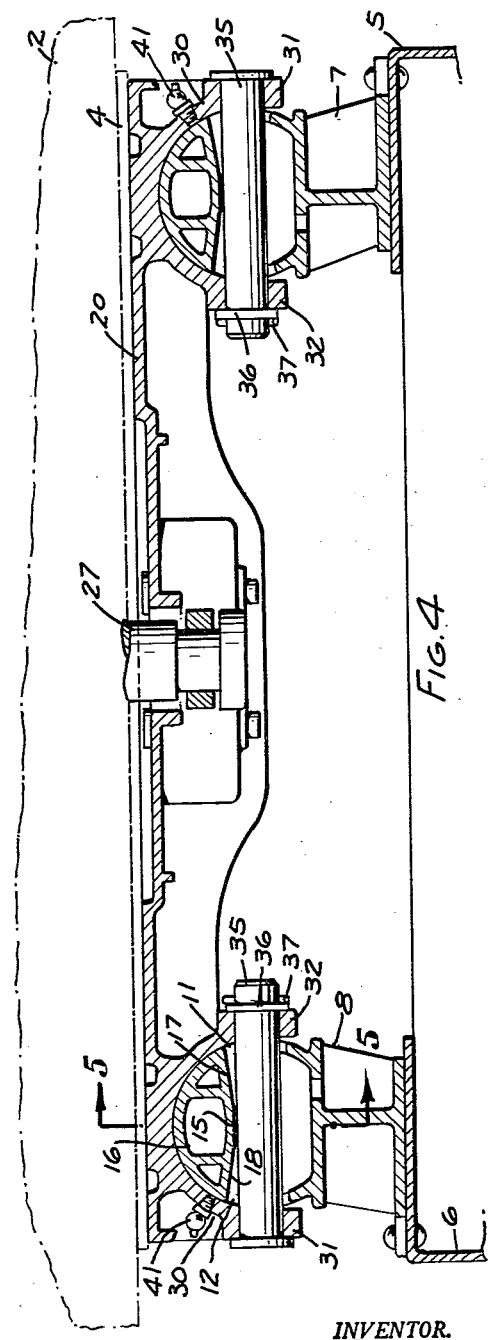
INVENTOR.
DONALD F. SEYFERTH
BY
*Barnes Kisselle Laughlin & Raisch*
ATTORNEYS.

June 4, 1957  D. F. SEYFERTH  2,794,656
ROCKING FIFTH WHEEL MEMBER FOR TRACTOR-SEMI-TRAILER VEHICLES
Filed Dec. 21, 1953  2 Sheets-Sheet 2
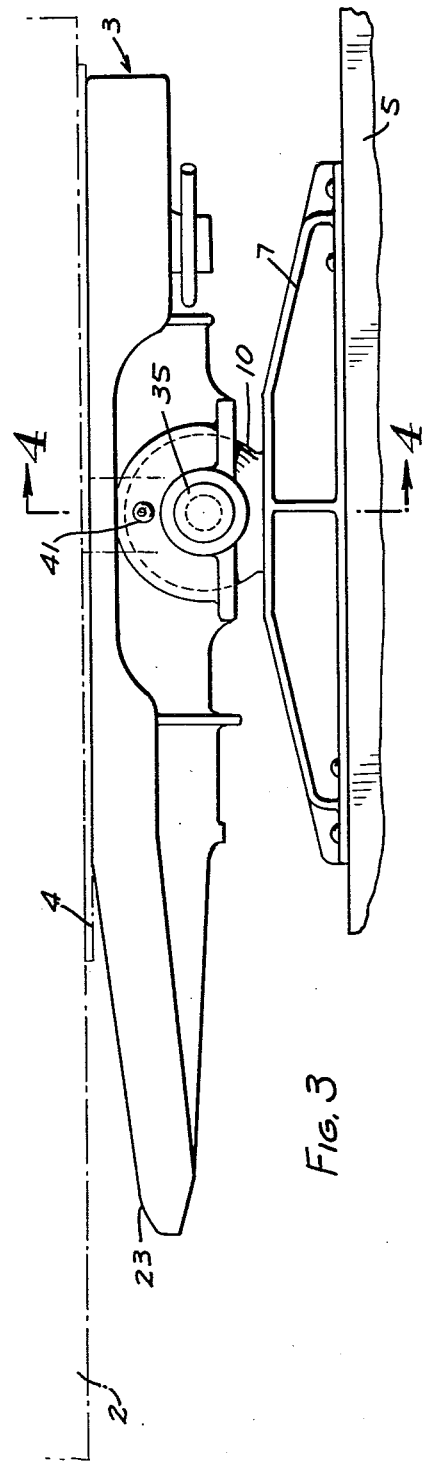
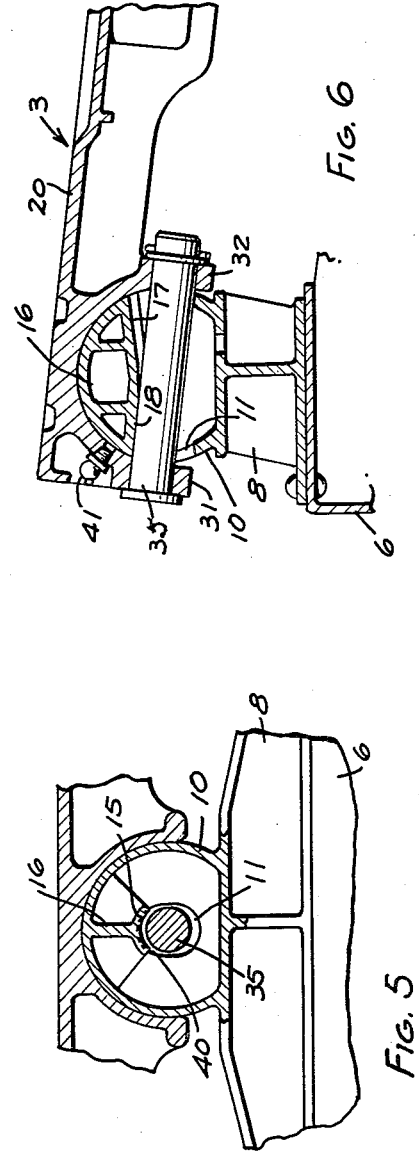
INVENTOR.
DONALD F. SEYFERTH
BY
ATTORNEYS.

2,794,656
Patented June 4, 1957

2,794,656

ROCKING FIFTH WHEEL MEMBER FOR TRACTOR-SEMI-TRAILER VEHICLES

Donald F. Seyferth, Muskegon, Mich., assignor to West Michigan Steel Foundry Co., Muskegon, Mich., a corporation of Michigan Application December 21, 1953, Serial No. 399,468

10 Claims. (Cl. 280—438)

This invention relates to the coupling structure for tractors and semi-trailers. It is concerned particularly with an improved construction in the rocking fifth wheel member which is usually located on a tractor for supporting a semi-trailer. Tractor and semi-trailer combinations are, of course, well known to those skilled in the art, and suffice it to say that the forward end of the semi-trailer rests upon the rear end of the tractor, and the semi-trailer and tractor are joined by a form of fifth wheel.

The objects of this invention are to provide an improved fifth wheel member which has a much greater bearing surface in all directions of normal load than that provided by the structure heretofore used where the fifth wheel member embodied pivot pins in its mounting. A further object of the invention is to provide a fifth wheel member which has a certain freedom of movement in all directions thus eliminating or minimizing strains and stresses incident to movement as the vehicle operates over a roadway. A still further object is to provide a fifth wheel structure wherein wear incident to use is automatically taken up and wherein wear of the parts will result in no lost play or looseness either longitudinally or laterally. In this connection the construction is one which, over a long period of time, will require little or no service or replacement of parts.

The invention is disclosed in the accompanying drawings which shows a structure made in accordance with the invention.

Fig. 1 is a general view illustrating a tractor semi-trailer combination vehicle.

Fig. 2 is a plan view of the lower fifth wheel applied to the tractor.

Fig. 3 is an enlarged side elevational view of the lower fifth wheel member.

Fig. 4 is a cross sectional view taken substantially on line 4—4 of Fig. 3 illustrating mounting structure.

Fig. 5 is a sectional view taken on line 5—5 of Fig. 4 showing the pivotal mounting.

Fig. 6 is a sectional view taken through one of the mountings illustrating angular movement.

In Fig. 1 a tractor is generally illustrated at 1 and the semi-trailer is illustrated at 2. Mounted on the rear end of the tractor is a lower fifth wheel member generally indicated at 3 and the trailer rests upon this lower fifth wheel member through the means of an upper fifth wheel member or plate 4.

The tractor frame is indicated as being comprised of structural members 5 and 6 and secured to the frame members are supporting brackets 7 and 8. These may be cast steel supports and may be of identical construction but reversed end for end. The brackets are secured to the structural frame members in any suitable frame members as by means of rivets as shown.

Each supporting bracket is formed on its top surface with a partially spherical bearing member 10 and the bearing member may be integrally cast with the body of the bracket. The partially spherical bearing member may be of hollow form, or at least partially of hollow form as shown, with oppositely positioned openings 11 and 12 through the spherical bearing surface thereof and substantially on the axis. In the upper region of the partially spherical member, or ball member as it may be termed, is an inverted bearing 15 of concaved shape on its underside, as shown in Fig. 5, and integrally formed with the ball by a fillet 16. When mounted on the tractor the openings 11 and 12 are positioned so that a line drawn therethrough is positioned transversely of the vehicle frame. As shown in Fig. 4, the bearing portion 15 is relatively centrally positioned within the ball and the fillet 16 has its lower walls as at 17 and 18 positioned angularly therefrom and which conveniently merge into the upper edges of the openings 11 and 12.

Since both spherical bearing members are the same, the same reference characters are applied thereto. The fifth wheel member which engages the semi-trailer, and generally indicated at 3, has a body portion or plate 20 with a V-shaped opening 21 defined by extensions 22 and 23 while in the central part there is a suitable latch or lock 25. In use, a king pin 27 which depends from the trailer fifth wheel plate 4 passes in through the opening 21 and is guided into the latch 25 and is shown as in engaged position in Fig. 4.

On the underside of the fifth wheel plate 20 there are two partially spherical concaved bearings for cooperation with the bearings 10. These may be formed integrally with the body 20 and are shown at 30. The bearings 30 have apertured portions 31 and 32 which generally line up with the openings 11 and 12 and a pin or bolt 35 is passed through the openings and through the ball. The pin may have a head on one side and may be held assembled by means such as a washer 36 and a key or pin 37 on the opposite side.

In the initial assembly the axis of the pin coincides with the center of the ball. The concavities of the partially spherical bearing member 30 nicely fit the balls as indicated. It will be noted that the pin 35 passes freely through the apertures 11 and 12 but that the inverted bearing 15 lies relatively closer to the central part of the pin as shown in Fig. 5. However there is some clearance between the pin and the inverted bearing 15 this clearance being indicated at 40. The bearings may be provided with suitable fittings 41 for introducing lubricant.

As indicated in Fig. 2, the center of the latch 25 is on or substantially on the center line connecting the transverse axis of the ball mountings. As indicated in Fig. 3, the lower fifth wheel plate 30 is mounted so that it is unbalanced, the rear end, including the tail pieces or extensions 22 and 23, being heavier so that normally the fifth wheel, when no load is upon it, is positioned in an inclined manner. Thus, in coupling, as is well known to those skilled in the art, the forward end of the trailer may ride up the inclined fifth wheel which then becomes substantially horizontal as the weight of the trailer is applied thereto as shown in Fig. 1.

Thus it will be observed that the fifth wheel member 3 is rockably mounted on spherical bearings which provides much greater bearing surface than do pintle pins or bolts. The weight, of course, is taken by the balls as the concaved partially spherical bearings rest thereon, and the pins 35 serve as hold-down or retaining elements and are normally free of the inverted bearing 15. Thus the pins 35 hold the parts in assembly and prevent a separation.

Freedom of movement is afforded when the tractor frame is subjected to movement and this is indicated in Fig. 6. The structural member 5 of the tractor frame may for example, be lowered relative to the structural element 6 and instead of exerting a binding action the fifth wheel plate 20 is free to rock on the ball mountings more or less in a transverse direction. Of course, at times the tipping will be opposite that shown in Fig. 6. Thus stresses and strains are avoided which accordingly prevents cracking or breaking or twisting of the parts. In other words, the structure allows the supporting frame to flex and oscillate and undue stresses are thus eliminated or minimized.

In one satisfactory structure, the transverse rocking movement was about 5° in either direction from the horizontal. This, of course, can be varied. The spherical mounting provides a large bearing surface in all directions of normal load. The ball and socket formation and interengagement is preferably about 180° or substantially full hemispherical. Due to the large bearing surface, wear is minimized, but even when the bearing surfaces do wear, such wear is automatically taken up because the surfaces remain spherical. Thus, no looseness develops in the mounting and specifically no lateral looseness develops. By lateral is meant, looseness in the mounting transversely of the longitudinal axis of the tractor frame. Accordingly, the structure is capable of operating over an exceptionally long period of time without requiring service or repair or replacement of parts. If, however, the surfaces do become substantially worn, one result is an increase in the clearance 40 between the hold-down pin 35 and the inverted hold-down bearing 15. If this clearance becomes too great it may be easily rectified by dis-assembling the parts and placing some weld metal in the surface of the inverted bearing to a depth sufficient to again provide the desired clearance.

I claim:

1. A fifth wheel structure for an articulated vehicle, such as a tractor and semi-trailer, comprising, two supporting devices of partially spherical form adapted to be attached to the tractor in spaced relationship transversely of the tractor, a fifth wheel plate, two bearing elements on the underside of the plate, spaced transversely relative to each other and each having a partially spherical concavity for fitting upon the partially spherical supporting devices, whereby the fifth wheel plate may rock on the partially spherical devices about an axis transverse to the tractor, and means loosely interengaging the partially spherical devices and the bearing elements with sufficient clearance so that each bearing element may rock on its respective partially spherical device on an axis passing through the respective spherical device lengthwise of the tractor.

2. A fifth wheel structure for an articulated vehicle, such as a tractor and semi-trailer, comprising, two supporting devices of partially spherical form adapted to be attached to the tractor in spaced relationship transversely of the tractor, a fifth wheel plate, two bearing elements on the underside of the plate, spaced transversely relative to each other and each having a partially spherical concavity for fitting upon the partially spherical supporting devices, whereby the fifth wheel plate may rock on the partially spherical devices about an axis transverse to the tractor, each partially spherical device having a transversely extending opening therethrough, a hold-down pin secured to each bearing element and extending through the opening in the respective partially spherical device with clearance with respect thereto, whereby each bearing element together with its hold-down pin may rock on the partially spherical device substantially about an axis transverse to the axis of the hold-down pin.

3. A fifth wheel structure for an articulated vehicle, such as a tractor and semi-trailer, comprising, two supporting devices of partially spherical form adapted to be attached to the tractor in spaced relationship transversely of the tractor, a fifth wheel plate, two bearing elements on the underside of the plate, spaced transversely relative to each other and each having a partially spherical concavity for fitting upon the partially spherical supporting devices, whereby the fifth wheel plate may rock on the partially spherical devices about an axis transverse to the tractor, each partially spherical device having a transversely extending opening therethrough, a hold-down pin secured to each bearing element and extending through the opening in the respective partially spherical device with clearance with respect thereto, whereby each bearing element together with its hold-down pin may rock on the partially spherical device substantially about an axis transverse to the axis of the hold-down pin and bearing means in each partially spherical device loosely associated with the respective hold-down pin.

4. A fifth wheel structure for an articulated vehicle, such as a tractor and a semi-trailer, comprising, bracket means adapted for attachment to the tractor and including bracket members spaced transversely of the tractor, a fifth wheel member, a mounting between each bracket member and the respective side portion of the fifth wheel member including a ball member and a socket member, one mounted on the bracket member and one mounted on the fifth wheel member, whereby the fifth wheel member may rock on an axis extending through the ball members and transversely of the tractor, and means positioned substantially on the axis of each ball member extending transversely of the tractor for interconnecting the respective ball member and socket member and tightly engaging one member and loosely associated with the other member, so that the respective ball and socket members may rock relative to each other substantially on an axis extending lengthwise of the tractor.

5. A fifth wheel structure for an articulated vehicle, such as a tractor and a semi-trailer, comprising, bracket means adapted for attachment to the tractor and including bracket members spaced transversely of the tractor, a fifth wheel member, a mounting between each bracket member and the respective side portion of the fifth wheel member including a ball member and a socket member, one mounted on the bracket member and one mounted on the fifth wheel member, whereby the fifth wheel member may rock on an axis extending through the ball members and transversely of the tractor, each ball member having an opening extending therethrough transversely of the tractor, a hold-down pin secured to each socket member and extending through the opening in the respective ball member with clearances, so that each ball member and its respective socket member may rock relative to each substantially on an axis extending lengthwise of the tractor.

6. A fifth wheel structure for an articulated vehicle, such as a tractor and a semi-trailer, comprising, bracket means adapted for attachment to the tractor and including bracket members spaced transversely of the tractor, a fifth wheel member, a mounting between each bracket member and the respective side portion of the fifth wheel member including a ball member and a socket member, one mounted on the bracket member and one mounted on the fifth wheel member, whereby the fifth wheel member may rock on an axis extending through the ball members and transversely of the tractor, each ball member having an opening extending therethrough transversely of the tractor, a hold-down pin secured to each socket member and extending through the opening in the respective ball member with clearances, so that each ball member and its respective socket member may rock relative to each substantially on an axis extending lengthwise of the tractor, and a hold-down bearing carried by each ball member and normally spaced from the respective hold-down pin.

7. A fifth wheel structure for an articulated vehicle, such as a tractor and a semi-trailer, comprising two supporting brackets for attachment to the tractor in spaced relationship transversely of the tractor, a partially spherical bearing member on each bracket, a fifth wheel plate, two bearing elements on the underside of the fifth wheel plate each having a partially spherical concavity for fitting upon the bearing members, the bearing elements each having an opening extending transversely therethrough, each bearing element having portions overlying the openings in the respective bearing member, a hold-down pin secured in said portions of each bearing element and extending freely through the opening in the respective bearing member, so that the concaved bearing elements may rock on the respective bearing members about an axis generally transverse to the axis of the hold-down pin, and a bearing part within each bearing member and overlying the central portion of each hold-down pin and spaced therefrom to retain the bearing elements on the bearing members.

8. A fifth wheel structure for an articulated vehicle such as a tractor and a semi-trailer, comprising, two supporting brackets for attachment to the tractor in spaced relationship transversely of the tractor, a partially spherical bearing member on each bracket, a fifth wheel plate, two bearing elements on the underside of the fifth wheel plate each having a partially spherical concavity for fitting upon the bearing members, the bearing elements each having an opening extending transversely therethrough, each bearing element having portions overlying the openings in the respective bearing member, a hold-down pin secured in said portions of each bearing element and extending freely through the opening in the respective bearing member, each hold-down pin being positioned substantially on the horizontal transverse axis of the bearing members and elements so that the fifth wheel plate may rock freely on the bearing members substantially about the axis of the hold-down pins, the hold-down pins extending through the openings freely and with clearance so that each concaved bearing element may rock on its bearing members about an axis generally transverse to the axis of the hold-down pin, and a bearing part on each bearing member loosely associated with each hold-down pin to hold the bearing elements against separation from the bearing members.

9. A fifth wheel structure for an articulated vehicle, such as a tractor and semi-trailer, comprising, two bearing elements adapted to be attached to the tractor in spaced relationship transversely of the tractor, a fifth wheel plate, two bearing elements on the underside of the plate spaced transversely relative to each other, two of said bearing elements being of convex form with partially spherical convex bearing surfaces, the other two of said bearing elements being of concave form with partially spherical concave bearing surfaces, the convex bearing elements being disposed in interfitting relationship with the concave bearing elements with their respective bearing surfaces in engagement, whereby the fifth wheel plate may rock about an axis transverse to the tractor, and means loosely interengaging the interfitting bearing elements with sufficient clearance so that the respective interfitting bearing elements may rock relative to each other on an axis passing therethrough lengthwise of the tractor.

10. A fifth wheel structure for an articulated vehicle, such as a tractor and semi-trailer, comprising, support means adapted to be attached to the tractor, a fifth wheel member above the support means, two upwardly facing bearing elements on the support means in spaced relationship transversely of the tractor, two downwardly facing bearing elements on the fifth wheel member spaced transversely relative to each other, two of said bearing elements being of convex form with partially spherical convex surfaces, the other two of said bearing elements being of concave form with partially spherical concave surfaces, the convex bearing elements being disposed in interfitting relationship with the concave bearing elements with their respective bearing surfaces in engagement and with the two bearing elements on the support means underlying the two bearing elements on the fifth wheel member, whereby the fifth wheel member may rock about an axis extending transversely of the tractor, and means loosely interengaging the interfitting bearing elements with sufficient clearance so that the respective interfitting bearing elements may rock relative to each other on an axis passing therethrough in a direction lengthwise of the tractor.

References Cited in the file of this patent

UNITED STATES PATENTS

| | | |
|---|---|---|
| 1,545,180 | Alley | July 7, 1925 |
| 2,093,761 | Kramer | Sept. 21, 1937 |
| 2,196,537 | Sherman | Apr. 9, 1940 |
| 2,468,013 | Kayler | Apr. 19, 1949 |
| 2,618,488 | Ketel | Nov. 18, 1952 |
| 2,718,411 | Geerds | Sept. 20, 1955 |